US007913198B2

(12) United States Patent
Holter

(10) Patent No.: US 7,913,198 B2
(45) Date of Patent: Mar. 22, 2011

(54) METHOD FOR DESIGNING ARRAY ANTENNAS

(75) Inventor: Henrik Holter, Saltsjö-Boo (SE)

(73) Assignee: SAAB AB, Linköping (SE)

(*) Notice: Subject to any disclaimer, the term of this patent is extended or adjusted under 35 U.S.C. 154(b) by 468 days.

(21) Appl. No.: 11/987,195

(22) Filed: Nov. 28, 2007

(65) Prior Publication Data

US 2008/0222577 A1 Sep. 11, 2008

(30) Foreign Application Priority Data

Nov. 28, 2006 (EP) .................................... 06445070

(51) Int. Cl.
*G06F 17/50* (2006.01)
*G06F 9/45* (2006.01)
*G01S 7/40* (2006.01)
*G01S 13/00* (2006.01)

(52) U.S. Cl. ........ 716/100; 716/106; 716/132; 716/136; 342/22; 342/165

(58) Field of Classification Search .................. 716/1, 4, 716/5, 10; 342/22, 25 A, 45, 165, 373; 343/705, 343/770, 844, 897
See application file for complete search history.

(56) References Cited

U.S. PATENT DOCUMENTS 4,644,364 A * 2/1987 Parks ............................ 343/825
5,767,802 A * 6/1998 Kosowsky et al. .............. 342/45
5,818,738 A * 10/1998 Effing ........................... 702/117
5,910,787 A * 6/1999 Berg et al. ..................... 342/165
5,942,899 A * 8/1999 Shrekenhamer et al. ...... 324/326
5,966,524 A * 10/1999 Burnett et al. .................... 703/5
6,175,337 B1 * 1/2001 Jasper et al. .................. 343/770
6,300,894 B1 10/2001 Lynch et al.
6,323,809 B1 11/2001 Maloney
6,417,795 B1 * 7/2002 Fischer ............................. 342/4
6,501,414 B2 * 12/2002 Arndt et al. ..................... 342/22
6,668,326 B1 * 12/2003 Sella et al. ......................... 726/6
6,771,218 B1 * 8/2004 Lalezari et al. ............... 342/373
6,834,380 B2 * 12/2004 Khazei ............................ 716/10
6,967,282 B2 * 11/2005 Tonomura et al. ............ 174/392
(Continued)

FOREIGN PATENT DOCUMENTS

JP 61084903 A 4/1986
(Continued)

OTHER PUBLICATIONS

Kiraga, A.; "On diagnostics of space plasma with tubular dipole antenna"; 2006; Plasma Science, 2006. ICOPS 2006. IEEE Conference Record—Abstracts. The 33rd IEEE International Conference on; pp. 265-265.*

(Continued)

*Primary Examiner* — Helen Rossoshek
(74) *Attorney, Agent, or Firm* — Venable LLP; Eric J. Franklin

(57) ABSTRACT

A method for designing low signature array antennas using a calculation method. The method proposes a way of improving antenna and signature performance of array antennas. According to the method electromagnetic antenna and signature characteristics are specified, an iterative optimizing method is performed to design the antenna to fulfil the specified characteristics, the iterative method is interrupted when a design fulfils the specified characteristics, and the specified characteristics are readjusted in an iterative optimizing method to follow if the specified characteristics not are fulfilled.

9 Claims, 2 Drawing Sheets

U.S. PATENT DOCUMENTS

| | | | | |
|---|---|---|---|---|
| 6,967,574 | B1 * | 11/2005 | Nelson | 340/551 |
| 7,042,385 | B1 * | 5/2006 | Wichmann | 342/22 |
| 7,439,901 | B2 * | 10/2008 | Needham et al. | 342/30 |
| 7,616,169 | B2 * | 11/2009 | Holter | 343/844 |
| 7,617,535 | B2 * | 11/2009 | Rentzis et al. | 726/24 |
| 7,619,554 | B2 * | 11/2009 | Shklarsky | 342/25 A |
| 2002/0090978 | A1 * | 7/2002 | Petrus et al. | 455/562 |
| 2005/0172252 | A1 * | 8/2005 | Cheng et al. | 716/10 |
| 2007/0026817 | A1 * | 2/2007 | Kodama | 455/78 |
| 2007/0028194 | A1 * | 2/2007 | Kurokawa | 716/1 |
| 2007/0100548 | A1 * | 5/2007 | Small | 701/214 |
| 2007/0219763 | A1 * | 9/2007 | Smith et al. | 703/2 |
| 2007/0257859 | A1 * | 11/2007 | Lashmore et al. | 343/897 |
| 2008/0316124 | A1 * | 12/2008 | Hook | 343/705 |
| 2009/0128393 | A1 * | 5/2009 | Stjernman | 342/4 |
| 2009/0219137 | A1 * | 9/2009 | Forster | 340/10.1 |
| 2010/0130873 | A1 * | 5/2010 | Yuen et al. | 600/484 |

FOREIGN PATENT DOCUMENTS

| | | |
|---|---|---|
| WO | WO-2004/038452 A1 | 5/2004 |
| WO | WO-2006/091162 A1 | 8/2006 |

OTHER PUBLICATIONS

Kavak et al.; "Vector channels for smart antennas. Measurements, statistical modeling, and directional properties in outdoor environments"; Jun. 2000; Microwave Theory and Techniques, IEEE Transactions on; vol. 48, Issue 6, pp. 930-937.*

Girvan et al.; "Non-uniformly spaced sub-arrayed printed self-tracking reflector antenna"; Publication Year: 2001; Antennas and Propagation, 2001. Eleventh International Conference on (IEE Conf. Publ. No. 480); vol. 2; pp. 817-820 vol. 2.*

Bocon et al.; "Phased array performance characteristics and compliance with SATCOM military standards"; Publication Year: 2005; Military Communications Conference, 2005. MILCOM 2005. IEEE; pp. 1712-1718 vol. 3.*

Patrik Persson et al; RCS Reduction of Antennas Integrated in an Infinite PEC Plane; IEEE; 2005; pp. 74-77.

R. W. Wills; Calculation of Radar Cross Section for an Active Array; IEE Colloquium on "Antenna Radar Cross-Section"; 1991, pp. 8/1-8/4.

Björn Thors et al; Broad-Band Fragmented Aperture Phased Array Element Design Using Genetic Algorithms; IEEE Transactions on Antennas and Propagation, vol. 54, No. 10; Oct. 2005; pp. 3280-3287.

J. Michael Johnson et al; Genetic Algorithms in Engineering Electromagnetics; IEEE Antennas and Propagation Magazine, vol. 39, No. 4; Aug. 1997; pp. 7-21, 1-page of Figures 13-14.

European Search Report—Apr. 19, 2007.

* cited by examiner

METHOD FOR DESIGNING ARRAY ANTENNAS

CROSS-REFERENCE TO RELATED APPLICATIONS

This application claims priority to European patent application 06445070.3 filed 28 Nov. 2006.

FIELD OF THE INVENTION

The present invention relates to a method for designing low signature array antennas using a calculation method.

BACKGROUND OF THE INVENTION

In the future many of the advanced low signature vehicles, such as air planes, missiles, unmanned aerial vehicles (UAV), ships and terrain vehicles, will be equipped with some kind of array antenna. It is of great importance that these array antennas exhibit low passive radar cross section.

It is a known fact that array antennas may cause a very high radar cross section. The total radar cross section of an array antenna is the result of several subcontributions. The most important subcontributions are mirror reflection, edge scattering, scattering, reflections in the feed network, grating lobes, scattering caused by the location of the antenna elements in the aperture and diffuse scattering due to mechanical inaccuracy of manufacture. For hull integrated antennas the antenna behaves electromagnetically different than the surrounding hull and in particular within the frequency band of operation of the antenna. The transition between the antenna and the surrounding hull consists of an impedance transition causing scattering and due to that radar cross section. Accordingly, the material of the surrounding hull may be of great significance.

Prior art array antennas of today are commonly designed based upon given requirements on antenna performance, such as frequency of operation, band width, field of view, lobe widths, side lobe level and polarisation. An example of an array antenna designed based upon such requirements is known from U.S. Pat. No. 6,323,809 disclosing designing of a fragmented array antenna. When designing array antennas in this way the signature reduction is set aside and has to be considered afterwards when mounted in a hull. One way of obtaining signature reduction in this connection is to introduce frequency selective surfaces and space demanding absorbents located around the edges of the array antenna. One disadvantage of frequency selective surfaces is that they perform insufficient with respect to signature reduction for frequencies and polarisation coinciding with the frequency and polarisation of the antenna. Furthermore, if the surface is curved it may be difficult to design and manufacture frequency selective surfaces.

The hulls of future low signature air vehicles will most likely consist of some kind of composite material. Such material does not behave as conducting metals having very good conductivity. Furthermore the conductivity of composites may be anisotropic, i.e. the conductivity varies in different directions. A frequency selective surface usually behaves electromagnetically as a good electric conductor within its suppressed frequency band. If the surrounding material consists of a composite the hull and the frequency selective surface will behave electromagnetically different and due to that be the cause of radar cross section.

SUMMARY OF THE INVENTION

The object of the invention is to obtain a method for designing array antennas avoiding the drawbacks of prior art methods discussed above.

The object of the invention is obtained by a method characterized in that electromagnetic antenna and signature characteristics are specified, an iterative optimizing method is performed to design the antenna to fulfil the specified characteristics, the iterative method being interrupted when a design fulfils the specified characteristics, and that the specified characteristics are readjusted in an iterative optimizing method to follow if the specified characteristics not are fulfilled. A main principle of the method is that given requirements on antenna and signature performance are simultaneously fulfilled. For frequencies, polarisation and directions in space in which low signature is required it is, as already indicated above, important that hull integrated antennas behave as the surrounding hull irrespective of the material. This requirement is fulfilled by the method according to the invention.

The following advantages of the method of the invention can be emphasized.

- Simultaneous optimizing of antenna and signature performance.
- Antenna and signature performance can be set according to given requirements.
- Arbitrary hull material can be managed.
- There is less need of absorbents being space demanding and difficult to apply between the antenna and surrounding hull.
- If grating lobes are a problem, commonly due to a sufficient high frequency of an enemy radar, suitable structures having higher periodicity than the periodicity of the element can be integrated in the optimizing method.

According to a favorable method of the invention an array antenna of fragmented array type is designed. The fragmented array antenna exhibits a great number of degrees of freedom involving many possibilities in the optimizing process. Other antenna elements having a great number of degrees of freedom are also conceivable.

According to another favorable method of the invention the optimizing method involves use of a genetic algorithm. Examples of genetic algorithms are i. a. discussed in B. Thors, H. Steyskal, H. Holter, "Broadband fragmented aperture phased array element optimization using genetic algorithms", IEEE Transactions on Antennas and Propagation, October 2005, pp. 3280-3287, and J. Michael Johnson and Yahya Rahmat-Samii, "Genetic Algorithms in Engineering Electromagnetics", IEEE Antennas and Propagation Magazine, Vol. 39, No. 4, August 1997, pp 7-21.

According to still another favorable method of the invention the reflection factor of the antenna is adapted to coincide in amount and phase with the reflection factor of a material surrounding the antenna when mounted. Introducing such a requirement will facilitate the use of arbitrary hull materials.

According to yet another favorable method of the invention a frequency selective surface is located in front of the antenna. By introducing such a frequency selective surface cross section, grating lobes arising at high frequencies can be dealt with. Preferably the frequency selective surface is provided with a periodic pattern having a periodicity being a multiple of the periodicity of the antenna.

BRIEF DESCRIPTION OF THE DRAWINGS

The invention will now be described in more detail below with reference to the accompanying drawings in which.

DETAILED DESCRIPTION OF EMBODIMENTS OF THE INVENTION

Figure 1:
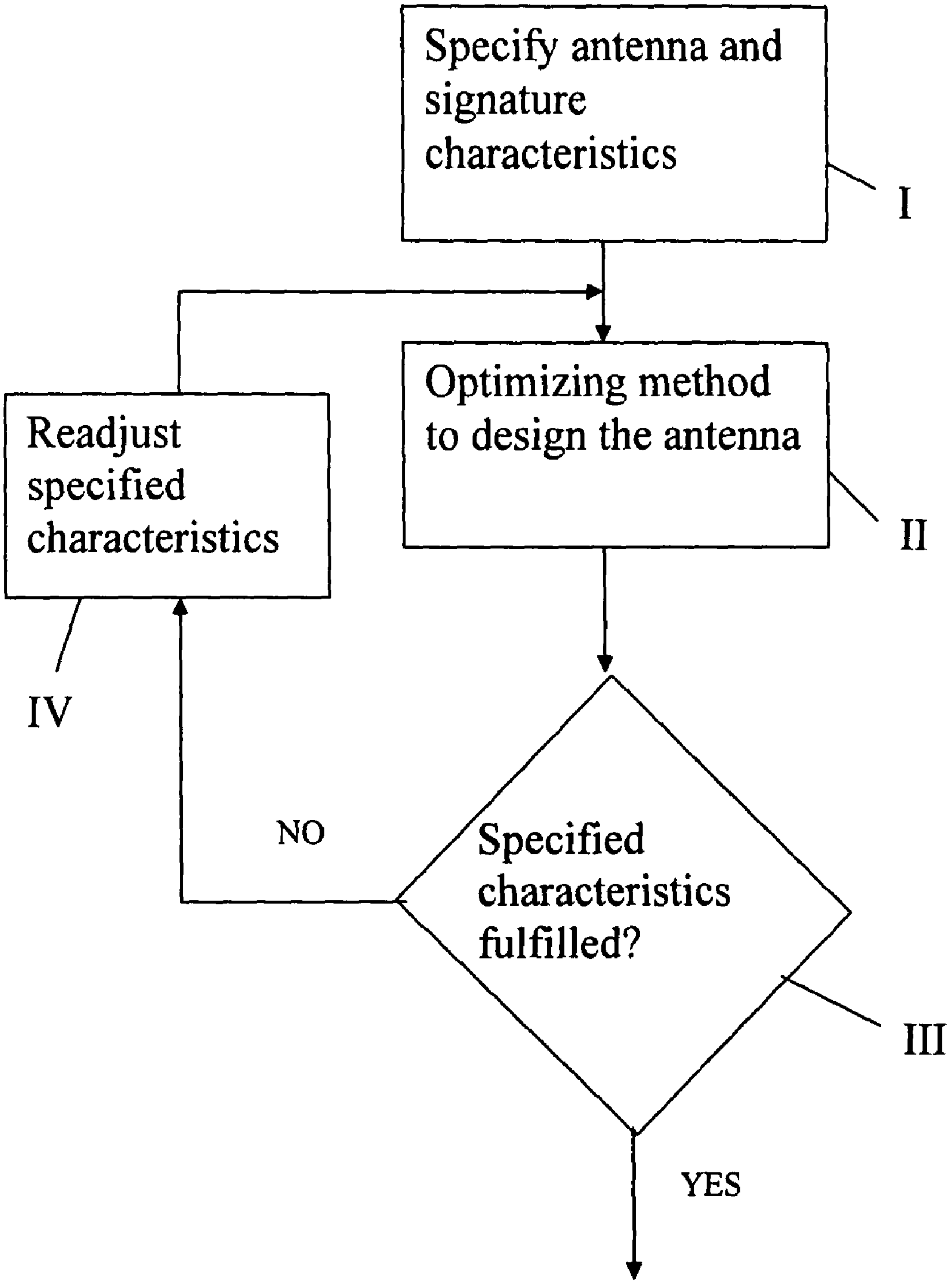
FIG. 1 shows a flow chart illustrating the main steps of a method for designing array antennas according to the invention.

According to the method illustrated in FIG. 1 the first step is to specify antenna and signature characteristics to be fulfilled, block I. Examples of particular antenna characteristics to be specified are frequency interval, antenna gain, side lobe level, field of view and so on. Examples of particular signature characteristics to be specified are radar cross section level, frequency interval and so on.

When the antenna and signature characteristics have been specified, an optimizing process is started, block II. During this step the process tries to find out a design of the antenna that fulfils the specified characteristics i. a. trying to find a design with acceptable low radar cross section often with the side condition that the reflection factor of the array antenna is to coincide with the reflection factor surrounding the array antenna. When using an antenna element to be described below with reference to FIGS. 2*a* and 2*b*, the design goal could be to find a distribution of conducting regions on the aperture surface, which together with suitably chosen permittivity and thickness of the included dielectric substrate will produce an antenna fulfilling specified antenna and signature characteristics and also fulfilling the above mentioned side condition. Preferably the optimizing process involves the use of a genetic algorithm coupled to a calculation program for infinitely large periodic structures.

If the optimizing process finds a design that fulfils the specified antenna and signature characteristics the optimizing process stops and an antenna design configuration is available as an output of block III.

If the specified antenna and signature characteristics have been set too strictly, it may happen that the optimizing process fails to find a design fulfilling the set requirements. In such a case the set antenna and signature characteristics can be readjusted, block IV, and a new optimizing process can be carried out.

Figure 2A:
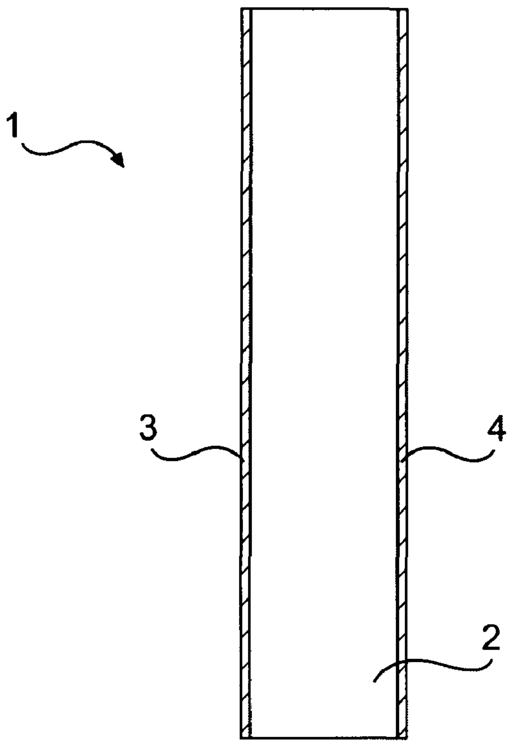
FIG. 2*a* in side view and FIG. 2*b* in front view show an example of an antenna element suitable for design applying the design method according to the invention.
Figure 2B:
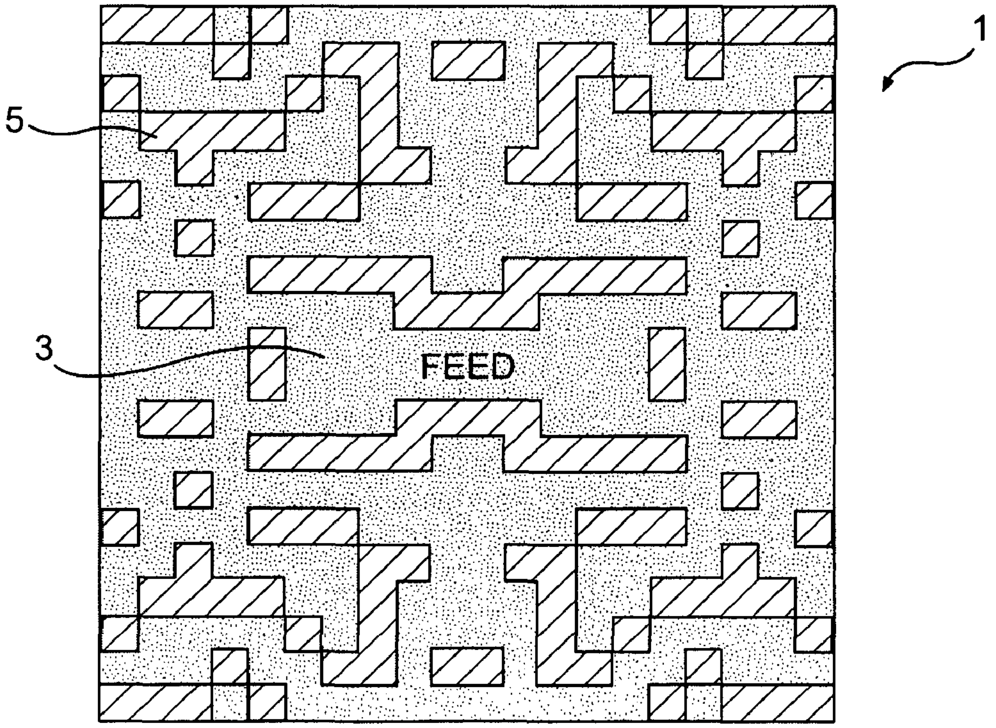

The antenna element shown in FIGS. 2*a* and 2*b* is a fragmented patch element to be included in an array antenna. The patch antenna 1 comprises a dielectric substrate 2 provided with a fragmented surface 3 on one side and a ground plane 4 on the other side. The fragmented surface 3 consists of small metal squares 5 preferably obtained by conventional etching technique. The number of possible embodiments of the metal pattern is very large so there are also a large number of degrees of freedom available in the designing process. When a so called genetic algorithm is used for the optimizing of the design of the antenna element, parameters to be taken into account are i. a. the metal pattern, thickness of the substrate and type of the substrate.

According to a further development of the embodiment shown in FIGS. 2*a* and 2*b* the fragmented surface or metal pattern 3 can be provided with a, not shown, further substrate layer above the metal pattern. In such a case this substrate is provided with a periodic patter having a periodicity being a multiple of the periodicity of the antenna element. By integrating suitable structures having higher periodicity than the periodicity of the element, the problem with grating lobes can be avoided. Such lobes arise when enemy radar exhibits a sufficient high frequency.

The method is described with reference to fragmented antenna elements above. It is however easy and within the scope of the invention to apply the same method to other array antennas having a large number of degrees of freedom. Furthermore, it has above been proposed that the optimizing method uses genetic algorithms. This does not exclude other suitable algorithms from being used in the general concept of the invention.

The invention claimed is:

1. A method for designing low radar signature array antennas comprising a fragmented-type array, the method comprising:

specifying electromagnetic antenna and radar signature characteristics;

performing an iterative optimizing method to design the antenna to fulfil the specified characteristics;

interrupting the iterative method when a design fulfils the specified characteristics;

readjusting the specified characteristics in an iterative optimizing method to follow if the specified characteristics not are fulfilled, thereby simultaneously optimizing the electromagnetic antenna and the radar signature characteristics; and applying to an antenna the design fulfils the specified characteristics.

2. The method according to claim 1, wherein the optimizing method comprises use of a genetic algorithm.

3. The method according to claim 1, wherein further comprising:

adapting a reflection factor of the antenna to coincide in amount and phase with reflection factor of a material surrounding the antenna when mounted.

4. The method according to claim 1, wherein a frequency selective surface is located in front of the antenna.

5. The method according to claim 4, wherein the frequency selective surface comprises a periodic pattern having a periodicity being a multiple of a periodicity of the antenna.

6. The method according to claim 1, further comprising:

making the antenna with the design that fulfils the specified characteristics.

7. A method for designing low radar signature array antennas, the method comprising:

specifying electromagnetic antenna and radar signature characteristics;

performing an iterative optimizing method to design the antenna to fulfil the specified characteristics;

interrupting the iterative method when a design fulfils the specified characteristics;

readjusting the specified characteristics in an iterative optimizing method to follow if the specified characteristics not are fulfilled, thereby simultaneously optimizing the electromagnetic antenna and the radar signature characteristics;

adapting a reflection factor of the antenna to coincide in amount and phase with reflection factor of a material surrounding the antenna when mounted; and applying to an antenna the design fulfils the specified characteristics.

8. A method for designing low radar signature array antennas, the method comprising:

specifying electromagnetic antenna and radar signature characteristics, wherein a frequency selective surface is located in front of the antenna;

performing an iterative optimizing method to design the antenna to fulfil the specified characteristics;

interrupting the iterative method when a design fulfils the specified characteristics;

readjusting the specified characteristics in an iterative optimizing method to follow if the specified characteristics not are fulfilled, thereby simultaneously optimizing the electromagnetic antenna and the radar signature characteristics; and applying to an antenna the design fulfils the specified characteristics.

9. The method according to claim 8, wherein the frequency selective surface comprises a periodic pattern having a periodicity being a multiple of a periodicity of the antenna.

* * * * *